April 19, 1932.  J. A. SCHEUTZ  1,854,675
SAFETY BUMPER
Filed April 17, 1931  4 Sheets-Sheet 1
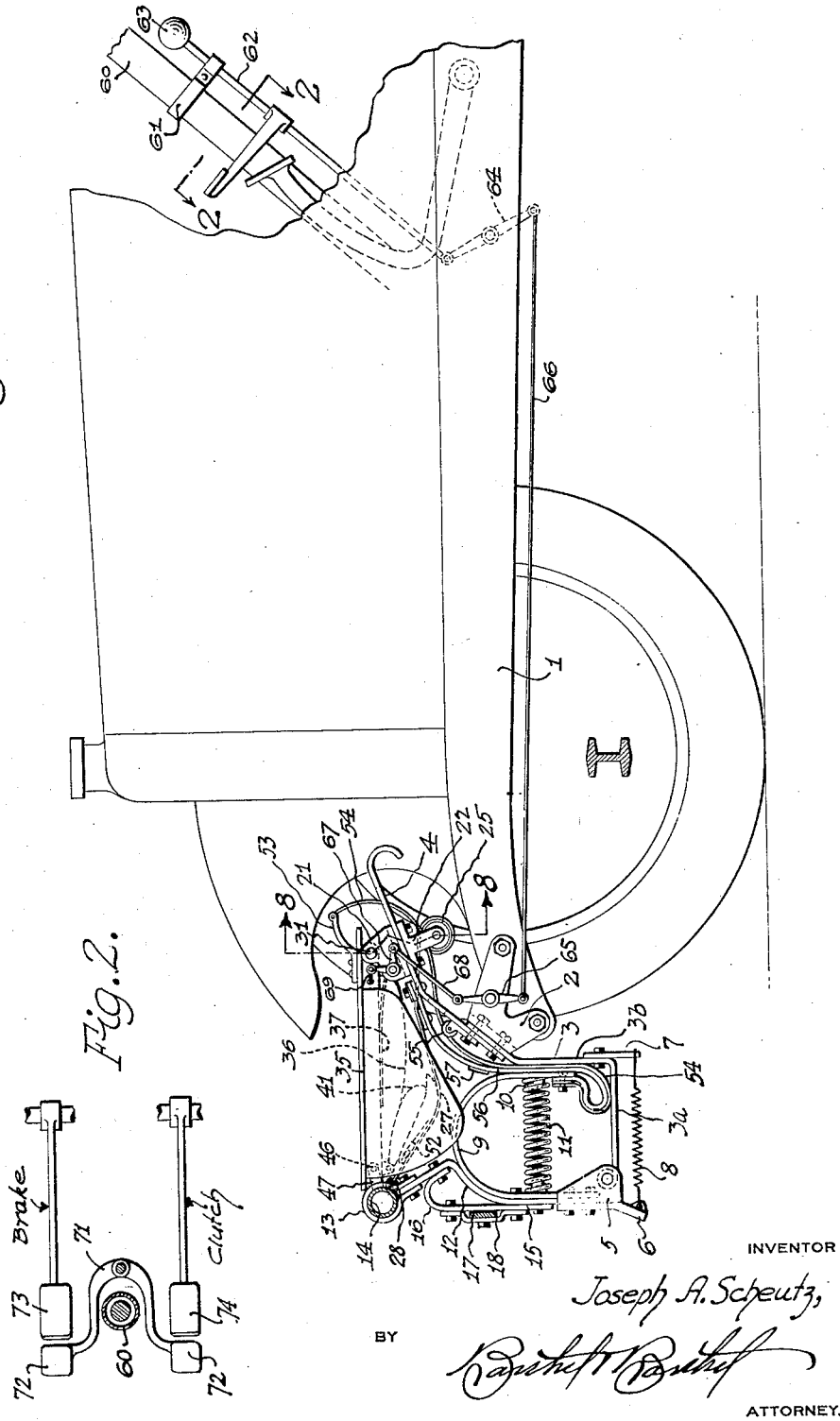
INVENTOR
Joseph A. Scheutz,
BY
ATTORNEYS April 19, 1932. J. A. SCHEUTZ 1,854,675
SAFETY BUMPER
Filed April 17, 1931 4 Sheets-Sheet 2
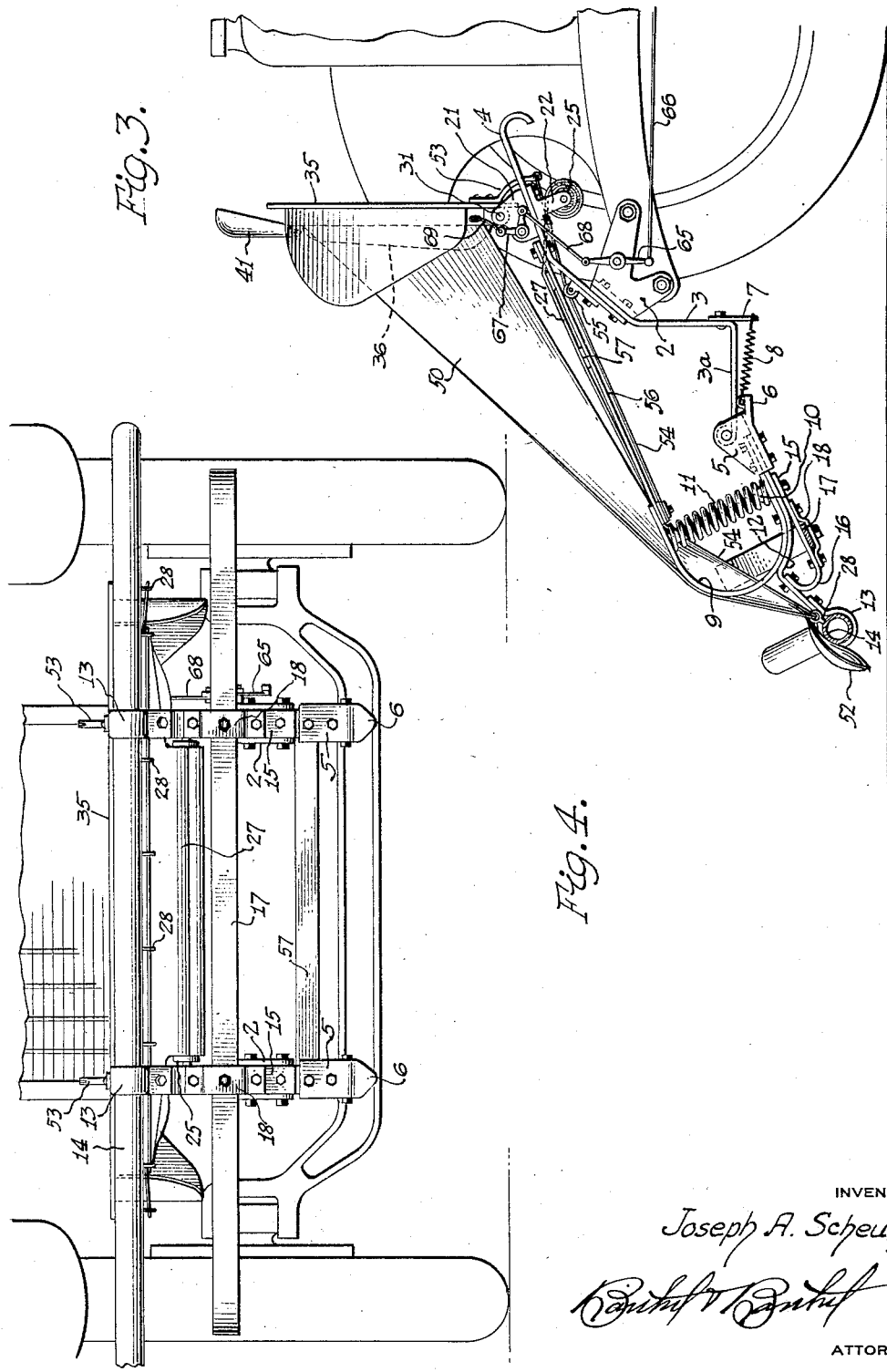
INVENTOR
Joseph A. Scheutz,
ATTORNEYS April 19, 1932.  J. A. SCHEUTZ  1,854,675
SAFETY BUMPER
Filed April 17, 1931  4 Sheets-Sheet 4
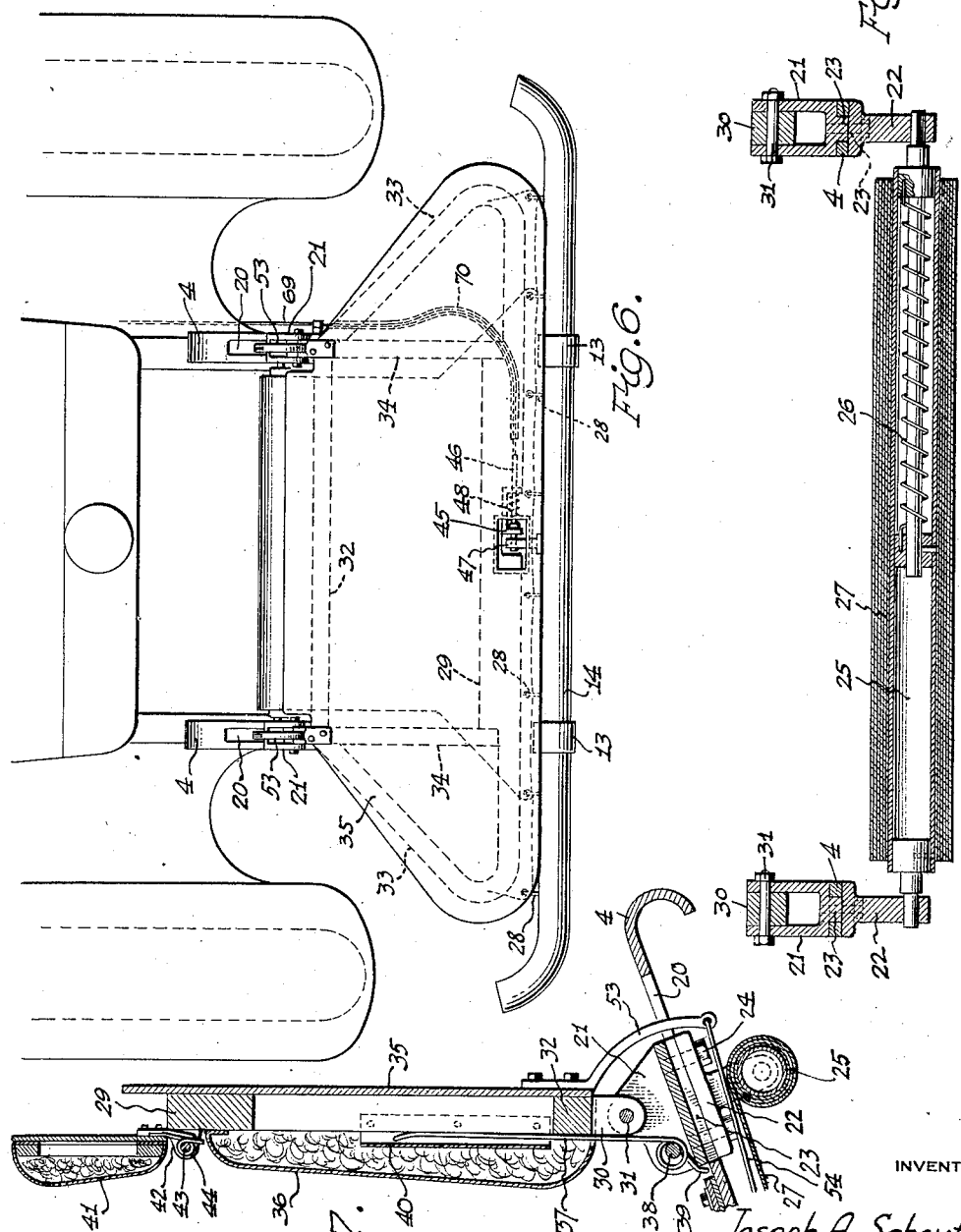
INVENTOR
Joseph A. Scheutz,
ATTORNEYS Patented Apr. 19, 1932

1,854,675

UNITED STATES PATENT OFFICE

JOSEPH A. SCHEUTZ, OF HAZEL PARK, MICHIGAN, ASSIGNOR TO SCHEUTZ SAFETY FENDER CORPORATION, OF DETROIT, MICHIGAN, A CORPORATION OF MICHIGAN

SAFETY BUMPER

Application filed April 17, 1931. Serial No. 530,915.

The present invention pertains to a novel safety bumper designed particularly for use in conjunction with motor vehicles.

The principal object of the invention is to provide a device of this character which, prior to or on the occurrence of an accident in which a person is struck by the forward end of the vehicle, may be opened out to form a hammock which will take a position such as to throw the person into it without bodily injury. The various parts of the device are so padded as not to injure the person even where hit by the safety bumper.

The invention embodies essentially a forward member and a back member pivotally mounted on the forward end of the vehicle and tensioned by springs to swing apart in opposite directions. These parts are however normally held together against the action of their springs by means of a lock, and in this condition the device is compact and is adapted to function as an ordinary bumper. A lock operating mechanism extends to the driver's station and is there adapted to be readily reached by him either manually or with either foot. In using the safety bumper in an accident, the operator releases the lock through the operating mechanism, whereupon the forward member and back member swing apart under the action of their springs as already indicated. This divergent movement of the forward and back members opens a hammock which is otherwise neatly folded between these parts. The forward member drops to a position close to the road, where it will readily upset the person struck by it and throw him into the hammock. As already stated, this striking portion is so padded as not to injure the person, and the hammock structure is also padded and supported throughout to avoid bruises or other injuries.

The invention is fully disclosed by way of example in the following description and in the accompanying drawings in which—

Figure 1 is a fragmentary side elevation, partly in section, of a motor vehicle equipped with a safety bumper according to this invention;

Fig. 2 is a section on the line 2—2 of Figure 1;

Fig. 3 is a detail view, similar to Figure 1, showing the bumper in open or operative position;

Fig. 4 is a front elevation of an automobile equipped with the safety bumper in closed position;

Fig. 6 is a plan view of the bumper in closed position;

Fig. 7 is a section on the line 7—7 of Fig. 5; and

Fig. 8 is a section on the line 8—8 of Fig. 1.

Reference to these views will now be made by use of like characters which are employed to designate corresponding parts throughout.

Figure 5:
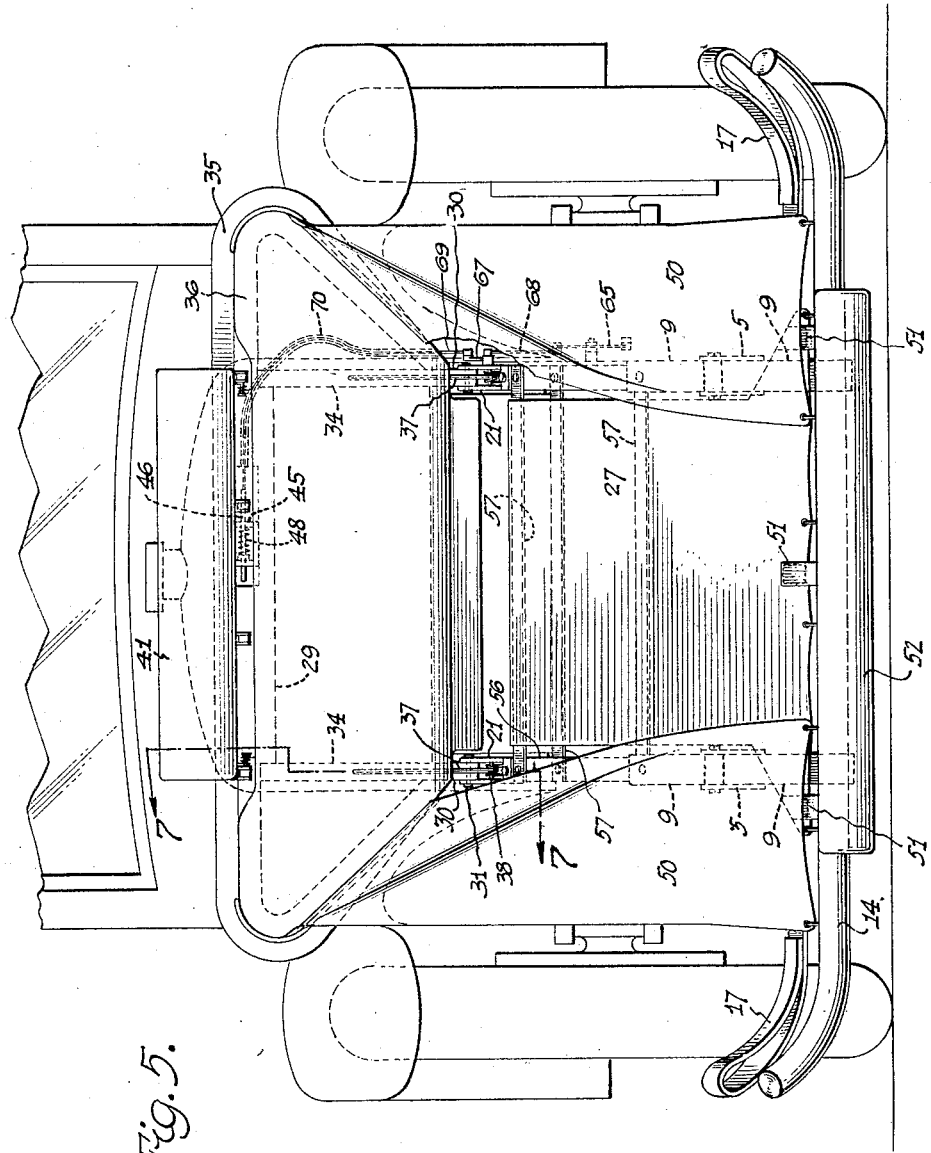
Fig. 5 is a similar front elevation showing the bumper in open or operative position.

In Figure 1 is illustrated a motor vehicle of usual construction having the conventional longitudinal chassis members 1. To the forward end of each member 1 is secured a main supporting bracket 2 for the safety bumper. To each of these brackets is secured a right angular forward supporting arm 3 and an inclined rear supporting arm 4. It will be seen in Fig. 1 that the foremost portion 3a of the member 3 lies in a horizontal plane and that the part 3b perpendicular thereto extends vertically upward from the horizontal portion towards the bracket 2.

To the foremost or free end of each part 3a is pivotally attached a hinge piece 5 having a finger 6 which extends downwardly when the device is closed as in Fig. 1. Another finger 7 is secured to the part 3b and extends downwardly therefrom. The fingers 6 and 7 are joined by a spring 8 which is under tension when the device is closed and therefore tends to throw the hinge piece downwardly or forwardly.

To each of the hinge pieces 5 is secured one end of a U-shaped or bow member 9 having parallel sides lying in vertical planes. The bows are preferably constructed of spring metal, and the sides of each bow preferably carry studs 10 to seat the ends of a coil spring 11 to increase the compression limit of the bows in functioning as an ordinary bumper without destroying their resiliency.

A strap or bracket 12 is secured to that side of each bow which lies foremost when the device is closed. The upper or free ends of the straps carry clips 13 which receive a tubular main bumper bar 14 extending across the straps 12 or across the front of the vehicle. In like manner two similar straps or brackets 15 are secured to the same sides of the bows and are bent at their upper ends as at 16 to brace the members 12. A flat auxiliary bumper bar 17 is secured across the members 15 by means of straps 18.

The rearward portion of each supporting arm 4 is slotted longitudinally at 20 (Figs. 7 and 8) to provide a slidable mounting for a two piece bracket consisting of an upper portion 21 above the arm and a lower portion 22 below the arm. The upper portion has a tongue 23 slidably received in the slot 20, and the parts 21 and 22 are secured together by bolts 24 extending from the lower part through the tongue 23. Between the members 22 is journalled a spring roller 25 tensioned by a spring 26 mounted therein in any suitable manner. An apron 27 of suitable heavy fabric, such as canvas, is wound on the roller and has its forward edge secured to the main bumper bar 14 by means of eyelets 28 as shown more clearly in Fig. 6. To the upper portions 21 is pivotally attached a quadrilateral frame 29 by means of lugs 30 and pins 31. The back member 32 of the frame is substantially as long as the distance between the side frame members 1, while the end members 33 of the frame diverge from the rear member towards the main bumper bar 14. The frame is preferably reinforced by transverse struts 34 which carry the pivot lugs 30. The frame is backed by a board or heavy fabric 35 which lies horizontally in the inoperative or closed position of the device as illustrated in Fig. 1.

The inner surface of the frame carries a cushion 36 as shown more clearly in Fig. 7 where the frame is swung to a vertical position. The back frame has a tendency to move to this vertical position through the action of a flat spring 37 coiled around a pin 38 on each member 21 and having one end 39 bearing against the member 21 and its other end received in a pocket 40 in the frame 29 and cushion 36.

A head cushion 41 is pivotally attached to the forward side of the frame 29 (or upper side when the frame is vertical) by means of lugs 42 and pivot pins 43. The head cushion is normally under tension to swing outwardly from the frame 29 to the position shown in Fig. 7 under the influence of springs 44 coiled around the pivot pins 43.

In the inoperative or closed position of the device, the head cushion 41 is swung against the cushion 36, as shown in Fig. 1, and the frame 29 is brought to a horizontal position. The main bumper bar 14 is brought against the forward side of the frame, and the parts are locked in this position against the action of the springs 8 and 37 by the mechanism shown more clearly in Fig. 6. The frame 29 carries a bracket 45 in which is slidably mounted a locking pin 46 adapted to enter a keeper 47 carried by the bar 14. A spring 48 surrounds the locking pin and is attached thereto and to the bracket 45 in a manner to project the pin into the keeper 47. The slidable mounting of the brackets 21, 22 in the slots 20 allow the rigid structure constituted by the connected parts 29 and 14 to yield when the bows 9 are compressed by a thrust against either of the bumper bars 14 and 17.

The pin may be withdrawn from the keeper by operating mechanism presently to be described, and on such withdrawal, the springs 8 swing the bows 9 outwardly and forwardly, and the springs 37 swing the frame 29 upwardly to a vertical position as illustrated in Figs. 3 and 7. The springs 44 also swing the head cushion 41 outwardly from the cushion 36. In this opening movement the apron 27 is unwound from the roller 25 and takes the inclined position shown in Figs. 3, 5 and 7.

Side wings or flaps 50 extend from the ends of the cushion 36 to the main bumper bar 14 at opposite sides of the apron 27. These members may be neatly folded beneath the cushion 13 when the device is collapsed and assume the sloped position shown in Figs. 3 and 5 when the device is open, whereby they constitute the sides of a hammock which is completed by the apron 27, the cushion 36 and pad 41. A bumper pad 52 is attached to the forward or lower ends of the apron 27 and wings 50 by means of tabs 51. This pad may also be swung over the apron when the device is collapsed and covers the bumper bar 14 when the device is open.

In the operation of the device as thus far described, the operator of the vehicle releases the locking pin 46 from the lug 45, by the mechanism presently to be described, if it appears to him that he cannot avoid striking a human being with the front end of the vehicle, or even if the person has been struck, if the accident had not been foreseen. The device instantly opens by the action of the springs 8 and 37 as already stated. The victim of the accident is hit by the padded part of the bumper 14 near the ankles and is therefore thrown off his feet and backward into the hammock, by reason of the forwardly moving bumper striking him below the center of gravity. The pad 52 is of such a nature that the person is not even bruised where struck thereby. The side wings 50 confine the person to the hammock while falling, and the apron 27 is so supported and the upper part of the device so padded that there will be no bodily injuries.

A pair of arms 53 extend from the frame 29 through the slots 20 as shown in Fig. 7.

A wire 54 extends from the free end of each such arm to the free end of the corresponding bow 9, passing through the arm 4 and over a pulley 55 carried thereby as shown in Fig. 1. Thus, when the bows 9 are swung forwardly by the springs 8, they raise the frame 29 by the pull of the wires 54 on the arms 53.

The previously mentioned cushioning of the apron 27 consists of flexible straps 56 extending from the free end of each bow 9 to the corresponding arm 4 as shown in Fig. 3 and transverse flexible straps 57 extending across the straps 56 at suitable points beneath the apron. These straps are preferably of a heavy fabric such as canvas so that they provide an effective cushion when taut and also may readily sag when the device is collapsed.

The operating mechanism for withdrawing the locking pin 46 from its keeper 47 is shown more clearly in Figs. 1 and 2.

On the steering post 60 is secured a bracket 61 in which is slidably mounted an operating rod 62 having a handle or knob 63 at its upper end within convenient reach of the driver. A rocker arm 64 is pivotally mounted on the frame 1 near the base of the steering post and has one end connected to the rod 62. Another rocker arm 65 is pivotally mounted on one of the main brackets 2 and has its lower end connected by a link 66 to the remaining end of the rocker arm 64. A bell crank lever 67 is mounted on one of the members 21 and has one end joined by a link 68 to the remaining end of the rocker arm 65. The remaining end of the bell crank 67 is connected by a cable 69 to one end of the rocking pin 64, as shown in Fig. 6. The portion of the wire 69 extending beneath the frame 29 is encased in a protecting sheath 70. The arrangement of the rocker arms and bell crank lever is such that a downward pressure on the operating rod 62 pulls the wire 69 and withdraws the pin 46 from its keeper 47.

In order that the device may be operated by foot, a yoke 71 is mounted on the rod 62 and has its ends formed as foot rests 72 which normally lie slightly forward of and slightly above the brake and clutch pedals 73 and 74 respectively. This position of the ends 72 does not interfere with the normal operation of the pedals 73 and 74 which may be actuated by the feet of the operator without striking the ends 72. When it is desired to operate the safety bumper, either foot of the operator need be raised only slightly higher and slightly further forward than usual in order to engage either of the yoke ends 72. The continued pressure of the foot to apply the brake or release the clutch, as the case may be, shifts the rod 62 and operates the lock mechanism in the manner already described. It is to be noted in this connection that the device is operable by either foot of the driver, so that it does not matter whether the driver first operates the clutch or the brake on the occurrence of an accident.

Although a specific embodiment of the invention has been illustrated and described, it will be understood that various alterations in the details of construction may be made without departing from the scope of the invention as indicated by the appended claims.

What I claim is:—

1. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried respectively by said members and adapted to lock said members together against the action of said springs, a locking member for holding said parts together, means for withdrawing said member, and a flexible hammock carried by said members.

2. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried respectively by said members and adapted to lock said members together against the action of said springs, a locking member for holding said parts together, means for withdrawing said member, a spring roller carried by one of said members, and an apron wound on said roller and connected to the other member.

3. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a spring roller carried by one of said members, an apron wound on said roller and connected to the other member, and side wings extending between said members at opposite sides of said apron.

4. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried respectively by said members and adapted to lock said members together against the action of said springs, a locking member for holding said parts together, means for withdrawing said member, a spring roller carried by said back member, and an apron wound on said roller and connected to said forward member.

5. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a spring roller carried by said back member, an apron wound on said roller and connected to said forward member, and side wings extending between said members at opposite sides of said apron.

6. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, and flexible cushioning straps mounted between said members and adapted to support said hammock when said members are swung apart.

7. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a spring roller carried by one of said members, an apron wound on said roller and connected to the other member, and flexible cushioning straps mounted between said members and adapted to support said apron when unwound.

8. A safety bumper comprising a forward member adapted for pivotal attachment on a horizontal axis to the front end of a motor vehicle, brackets adapted to be supported by said vehicle at the front end thereof and behind said forward member, a back member pivotally attached to said brackets on a horizontal axis, springs tending to swing said members apart on their pivotal axes, locking means having co-operating parts carried by said members and adapted to lock said members together against the action of said springs, and a flexible hammock carried by said members.

9. A safety bumper comprising a forward member adapted for pivotal attachment on a horizontal axis to the front end of a motor vehicle, brackets adapted to be supported by said vehicle at the front end thereof and behind said forward member, a back member pivotally attached to said brackets on a horizontal axis, springs tending to swing said members apart on their pivotal axes, locking means having co-operating parts carried by said members and adapted to lock said members together against the action of said springs, a flexible hammock carried by said members, a spring roller carried by said brackets, and an apron wound on said roller and connected to said forward member.

10. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, an arm attached to said back member and extending downwardly across the pivotal axis thereof, and a flexible connection between said arm and said member, whereby said members swing in unison.

11. A safety bumper comprising a resilient forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, and a flexible hammock carried by said members.

12. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, and cushion springs mounted in said forward member and lying horizontally when said members are locked together.

13. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, and operating mechanism adapted to be mounted near the driver's seat of said vehicle and connected to said locking mechanism.

14. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, an operating rod adapted to be movably supported by the steering column of said vehicle and connected to said locking means, and a pedal carried by said rod.

15. A safety bumper comprising a forward member adapted for pivotal attachment on a horizontal axis to the front end of a motor vehicle, a back member adapted for pivotal attachment on a horizontal axis to the front end of said vehicle and behind said forward member, springs tending to swing said members apart on their pivotal axes, locking means having co-operating parts carried by said members and adapted to lock said members together against the action of said springs, a flexible hammock carried by said members, an operating rod adapted to be movably supported by the steering column of said vehicle and connected to said locking means, and a yoke carried by said rod and terminating in a pair of pedals adapted to be positioned respectively adjacent the brake and clutch pedals of said motor vehicle.

In testimony whereof I affix my signature.

JOSEPH A. SCHEUTZ.